United States Patent [19]
Berkowitz et al.

[11] 3,853,867
[45] Dec. 10, 1974

[54] METHOD OF STABILIZING DICHLOROCYANURIC ACID SALTS

[75] Inventors: Sidney Berkowitz, Highland Park; Edwin S. Roth, East Brunswick, both of N.J.

[73] Assignee: FMC Corporation, New York, N.Y.

[22] Filed: May 4, 1973

[21] Appl. No.: 357,481

Related U.S. Application Data

[63] Continuation-in-part of Ser. Nos. 239,769, March 30, 1972, abandoned, and Ser. No. 243,420, April 12, 1972, abandoned.

[52] U.S. Cl.......... 260/248 C, 260/248 A, 424/249, 252/187
[51] Int. Cl............................................. C07d 55/40
[58] Field of Search..................... 260/248 C, 248 A

[56] References Cited
UNITED STATES PATENTS

| | | | |
|---|---|---|---|
| 3,145,206 | 8/1964 | Fuchs et al. | 260/248 |
| 3,452,012 | 6/1969 | Langenhoff et al. | 260/248 |
| 3,453,274 | 7/1969 | Murrin et al. | 260/248 |

Primary Examiner—John M. Ford

[57] ABSTRACT

Dry alkali metal salts of dichlorocyanuric acid stabilized with cyanuric acid or its sodium salt against self-sustaining, thermally-initiated decomposition are protected against self-initiated chemical decomposition by mixing the stabilized dichlorocyanuric salts with an inorganic salt which gives in aqueous solution a pH of at least 9. The essential components of the composition are (1) from about 10–70 percent of an alkali metal dichlorocyanurate; (2) from about 25–75 percent of cyanuric acid or the alkali metal salt thereof; and (3) from about 5–50 percent of an inorganic salt the pH of which is at least 9 in aqueous media. The aforesaid percentages are by weight and are based on the total composition.

4 Claims, No Drawings

METHOD OF STABILIZING DICHLOROCYANURIC ACID SALTS

CROSS REFERENCE TO RELATED APPLICATIONS

This application is a continuation-in-part of Ser. No. 239,769 filed Mar. 30, 1972 and Ser. No. 243,420 filed Apr. 12, 1972, both now abandoned.

This invention relates to the stabilization of dichlorocyanuric acid salts against self-sustaining, thermally initiated decomposition and self-initiated chemical decomposition.

The chlorinated cyanuric acids are well known industrial chemicals, widely used to supply active chlorine in water supplies to prevent the growth of pathogenic bacteria in swimming pools and in detergent and sanitizing compositions. In particular, the alkali metal salts of dichlorocyanuric acid have been accepted as a convenient source of active chlorine. This, along with their generally good stability under normal handling conditions has resulted in substantial commercial demand. Such salts are generally produced in the form of a fine crystalline powder in order to make them readily soluble in the liquids to be treated. Coarser particles are utilized when they are sufficiently soluble.

Despite the fact that the salts of dichlorocyanuric acid are generally stable, they display an extraordinary type of decomposition which is most serious. If any portion of a bulk mass of the salt is exposed to a source of intense heat (for example, an unextinguished match or cigarette butt) there commences a creeping self-sustaining, thermally initiated decomposition which ultimately decomposes the entire quantity of salt. This decomposition reaction is not a true oxidation since it occurs even under vacuum conditions. Nevertheless, the effect of such decomposition is the complete destruction of the ability of the dichlorocyanuric acid salt to yield active chlorine and, consequently, removal of its primary chemical utility.

According to U.S. Pat. No. 3,145,206 issued to Fuchs, et al., such decomposition can be inhibited by mixing dry salts of dichlorocyanuric acid with up to about 25 percent of dichlorocyanuric acid or cyanuric acid. However, when cyanuric acid or an alkali metal salt thereof is used as the inhibitor near the upper concentration or higher, the resultant composition is prone to chemically initiated decomposition. The latter type of breakdown is manifested by the evolution of chloroamines, especially nitrogen trichloride, a highly reactive and even explosive compound.

Since cyanuric acid or its alkali metal salts are added to swimming pools or other large bodies of water in combination with alkali metal dichlorocyanurates to retard chlorine dissipation, a stabilized dry blend of these ingredients would greatly facilitate their shipping and handling.

In accordance with the present invention, there is provided a process for the stabilization of dichlorocyanuric acid salts inhibited against thermally initiated decomposition with cyanuric acid or an alkali metal salt thereof, by adding to such material 5–50 percent by weight, based on the total composition, of an inorganic salt which exhibits in aqueous media a pH of at least 9, preferably 9–13. The invention provides the thermally and chemically stabilized salts of dichlorocyanuric acid and a process for preparing them.

In carrying out the invention, the inorganic salt, cyanuric acid or an alkali metal salt thereof, for example, sodium cyanurate, and a dichlorocyanuric salt are blended together in the known manner of mixing powdered materials. A tumbler mixer is conveniently used although gentle hand blending is satisfactory for laboratory scale. The mixing should not be so vigorous as to cause excessive frictional heat, since dichlorocyanuric salts are thermally unstable above 200°C.

Although any soluble dichlorocyanuric acid can be used in formulating the compositions herein, the alkali metal dichlorocyanurates are preferred and in particular the sodium and potassium salts.

In general, any relatively stable inorganic salt whose pH in aqueous media is at least 9, preferably 9–13, is effective in retarding the chemical breakdown of dichlorocyanuric acid salts inhibited against thermal decomposition with cyanuric acid or its alkali metal salts. Commonly, such inorganic salts are the alkali and alkaline earth metal salts of weak acids, for example, carbonic acid, silicic acid, polyphosphoric acid and the like. Especially convenient and effective are sodium or potassium carbonate, sodium or potassium tripolyphosphate and sodium or potassium silicate.

The amount of stabilizer depends to some extent on the particular compound used as well as the quantity of cyanuric acid. By preparing a few trial formulations, the minimum quantity of inorganic salt required to effect a practical degree of chemical stability can be ascertained. Generally satisfactory results are attained where the concentration of the dichlorocyanuric acid salt varies from about 10–70 percent, the inorganic salt from about 5–50 percent and the cyanuric acid from about 25–75 percent. Preferably the concentration of dichlorocyanuric acid salt is from about 35–65 percent, the inorganic salt from about 5–15 percent and the cyanuric acid from about 30–50 percent. The alkali metal dichlorocyanurate, cyanuric acid or its alkali metal salt and the inorganic salt are the essential components of the compositions herein and the concentrations of such components always add up to 100 percent, exclusive of ancillary ingredients which do not affect the novel characteristics of the composition and which may be included in addition to the essential components. Such adjuncts are perfumes, inert diluents, dissolution retardants, colorants or the like.

The following examples are provided to further illustrate this invention. The proportions in the examples and the rest of the specification are by weight unless otherwise indicated. Percentages are based on the total compositions.

EXAMPLE 1

Sample A, for comparison, was prepared by homogeneously mixing sodium dichlorocyanurate and 47.5 percent cyanuric acid. The mixture had a mesh size of −20+70. Sample 1 was prepared by homogeneously mixing sodium dichlorocyanurate, and 43.4 percent cyanuric acid and 9.1 percent sodium carbonate. Sample A developed an immediate strong odor of nitrogen trichloride which was verified by mass spec and UV spectrometry. Sample 1 was odorless, with no detectable amounts of nitrogen trichloride.

The samples were placed in Erlenmeyer flasks capped with 2 mil polyethylene/paper laminate semipermeable membranes and subjected to an accelerated stability test at 100°F (38°C) and 80 percent relative humidity for 4 weeks. The test results are summarized in Table I below. In this and the other examples the "percent added" plus the amount of dichlorocyanurate equals 100 percent.

Table I

| Sample Number | Salt | Additives | % Added | Results |
|---|---|---|---|---|
| A | sodium dichlorocyanurate | cyanuric acid | 47.5 | Nitrogen trichloride generation. 12.5% loss of available chlorine/month. |
| 1 | sodium dichlorocyanurate | cyanuric acid sodium carbonate | 43.4 9.1 | No nitrogen trichloride generation. 2.3% loss of available chlorine/month. |

The stabilizing effect of the added inorganic salt on the dichlorocyanurate salt is readily manifest.

EXAMPLE 2

To determine the effect of the pH of various inorganic salts on the stabilization of salts of dichlorocyanuric acid, a number of homogeneous blends were prepared and evaluated for nitrogen trichloride generation and stability. The results are listed below in Table II. Samples B, C, D, E, and F are comparison examples.

EXAMPLE 3

All compositions in Table II which exhibit good chemical stability as evidenced by no nitrogen trichloride generation were further tested for progressive, thermally initiated decomposition. A 26 gauge Nichrome wire was imbedded in a 25 gram sample. The wire was heated red hot by passing a current through it for several seconds, until the material in contact with the wire decomposed. The current was turned off and the decomposition was observed to determine the tendency for self-propagation. None of the mixtures listed in Table III decomposed.

TABLE III

| Sample No. | Salt | Additives | % Added | Results |
|---|---|---|---|---|
| 2 | sodium dichlorocyanurate | cyanuric acid sodium carbonate | 43.4 9.1 | No decomposition |
| 3 | potassium dichlorocyanurate | cyanuric acid sodium carbonate | 43.4 9.1 | do. |
| 4 | potassium dichlorocyanurate | cyanuric acid potassium carbonate | 43.4 9.1 | do. |
| 5 | sodium dichlorocyanurate | cyanuric acid sodium silicate | 43.4 9.1 | do. |
| 6 | sodium dichlorocyanurate | cyanuric acid sodium tripolyphosphate | 43.4 9.1 | do. |

TABLE II

| Sample Number | Salt | Additives | % Added | Results |
|---|---|---|---|---|
| B | sodium dichlorocyanurate | cyanuric acid | 47.5 | Immediate NCl₃ generation, stability poor. |
| C | potassium dichlorocyanurate | cyanuric acid | 47.5 | do. |
| D | sodium dichlorocyanurate | cyanuric acid sodium sulfate | 43.4 9.1 | do. |
| E | sodium dichlorocyanurate | cyanuric acid sodium chloride | 43.4 9.1 | do. |
| F | sodium dichlorocyanurate | cyanuric acid sodium acetate | 48.5 9.1 | do. |
| 2 | sodium dichlorocyanurate | cyanuric acid sodium carbonate | 43.4 9.1 | No trace of NCl₃ generation, stability good. |
| 3 | potassium dichlorocyanurate | cyanuric acid sodium carbonate | 43.4 9.1 | do. |
| 4 | potassium dichlorocyanurate | cyanuric acid potassium carbonate | 43.4 9.1 | do. |
| 5 | sodium dichlorocyanurate | cyanuric acid sodium silicate | 43.4 9.1 | do. |
| 6 | sodium dichlorocyanurate | cyanuric acid sodium tripolyphosphate | 43.4 9.1 | do. |
| 7 | potassium dichlorocyanurate | cyanuric acid sodium tripolyphosphate | 43.4 9.1 | No trace of NCl₃ generation, stability good. |
| 8 | sodium dichlorocyanurate | cyanuric acid calcium carbonate | 43.4 9.1 | do. |
| 9 | potassium dichlorocyanurate | cyanuric acid calcium carbonate | 43.4 9.1 | do. |
| 10 | sodium dichlorocyanurate | cyanuric acid potassium carbonate | 43.4 9.1 | do. |

Comparison samples B and C without any inorganic salt and comparison samples D, E, and F containing either neutral inorganic salt or one whose pH on hydrolysis is outside the pH range of 9–11 give no chemical stability as evidenced by evolution of nitrogen trichloride.

TABLE III-Continued

| Sample No. | Salt | Additives | % Added | Results |
|---|---|---|---|---|
| 9 | potassium dichlorocyanurate | cyanuric acid calcium carbonate | 43.4 9.1 | do. |
| 10 | sodium dichlorocyanurate | cyanuric acid potassium carbonate | 43.4 9.1 | do. |

What is claimed is:

1. A composition of matter containing as its essential components (1) from about 35–65 percent of an alkali metal dichlorocyanurate; (2) from about 30–50 percent of cyanuric acid or the alkali metal salt thereof; and (3) from about 5–15 percent of an inorganic salt the pH of which is at least 9 in aqueous media, the percentages of said components being by weight and together totaling 100.

2. The composition according to claim 1 wherein the alkali metal dichlorocyanurate is sodium dichlorocyanurate.

3. The composition according to claim 1 wherein the alkali metal dichlorocyanurate is potassium dichlorocyanurate.

4. The composition according to claim 1 wherein the alkali metal cyanurate is sodium cyanurate.

* * * * *